No. 677,858. Patented July 9, 1901.
W. H. COLLIER.
VALVE ACTUATING MECHANISM.
(Application filed Apr. 9, 1900.)
(No Model.) 2 Sheets—Sheet 1.
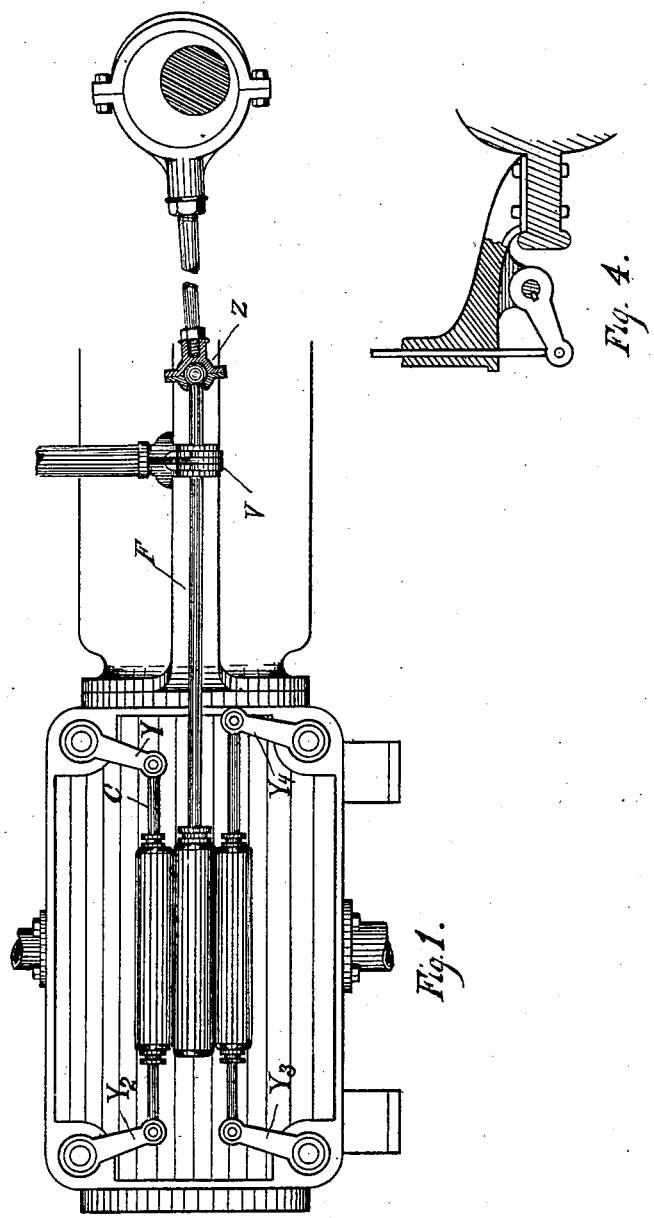
WITNESSES: William H. Collier, INVENTOR.

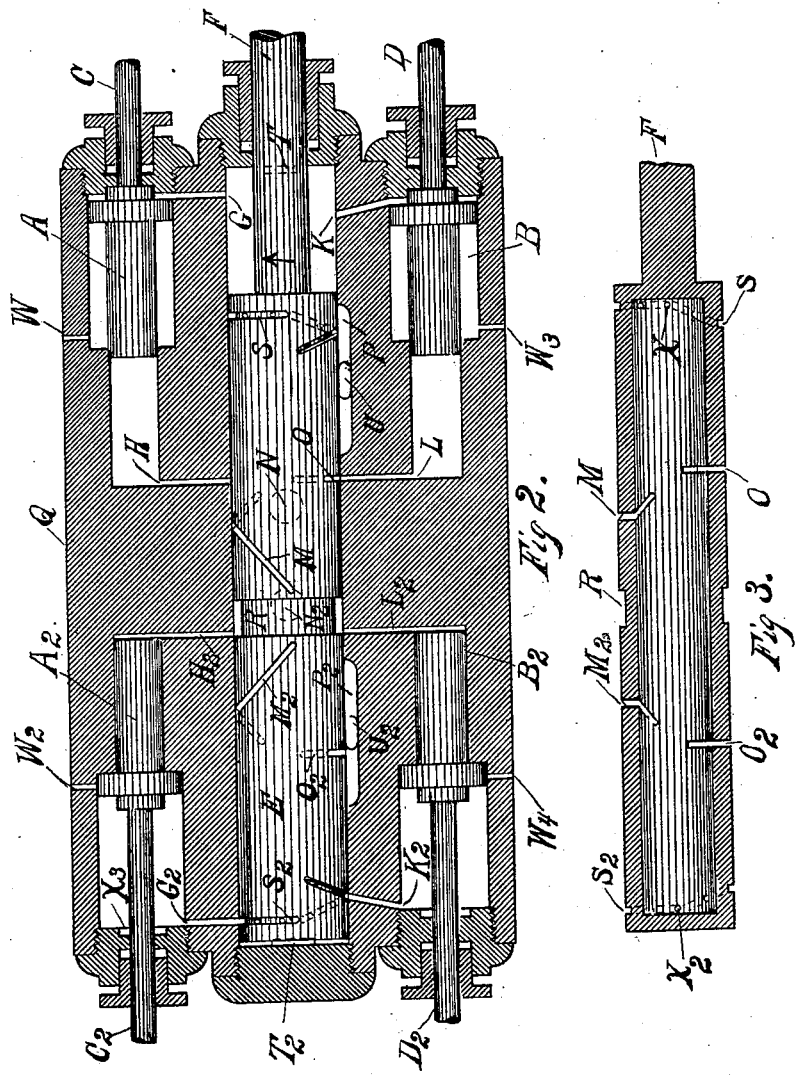

UNITED STATES PATENT OFFICE.

WILLIAM HENRY COLLIER, OF JACKSON, TENNESSEE.

VALVE-ACTUATING MECHANISM.

SPECIFICATION forming part of Letters Patent No. 677,858, dated July 9, 1901.

Application filed April 9, 1900. Serial No. 12,267. (No model.)

*To all whom it may concern:*

Be it known that I, WILLIAM HENRY COLLIER, a citizen of the United States, residing at Jackson, in the county of Madison, State of Tennessee, have invented a new and useful Improvement in Valve-Actuating Mechanism, of which the following is a specification.

My invention relates to an improvement in valve-actuating mechanism in which the steam and exhaust valves are operated by steam-actuated pistons; and the objects of my improvement are, first, to secure a full and instantaneous opening of the admission and exhaust valves; second, to secure a full and instantaneous closing of the admission and exhaust valves; third, to secure a variable point of cut-off and compression with fixed admission and release, and, fourth, to secure a theoretically perfect distribution of steam. I attain these objects by the mechanism illustrated in the accompanying drawings, in which—

Figure 1 is a side view of the entire mechanism as applied to Corliss valves. Fig. 2 is a vertical section of the mechanism, and Fig. 3 is a vertical section of the controlling-valve. Fig. 4 is a sectional view through governor-stand, showing details of rocker-arm.

Similar letters refer to similar parts throughout the different views.

The outside casing Q of the mechanism is connected to the side of the cylinder, Fig. 1. The controlling-valve E, Figs. 2 and 3, is hollow, having closed ends with annular and spiral grooves S $S^2$, connected to inside of valve by holes X $X^2$, grooves O $O^2$, extending partly around and through to hollow of valve, annular groove R, extending around but not connected to hollow of valve, and spiral grooves M $M^2$, extending partly around and through to hollow of valve. Controlling-valve E has fixed rod F passing through rocker-arm V of governor, Figs. 1 and 4, and connected by means of ball-joint Z to an eccentric on main shaft having a fixed throw. Rod F has an extended keyway, in which works key in rocker-arm V, the extended keyway allowing the rod a lineal movement independent of the rocker-arm. Pistons A $A^2$ B $B^2$ are connected to engine-valves by means of rods C $C^2$ D $D^2$ and arms Y, $Y^2$, $Y^3$, and $Y^4$, the ports U $U^2$ being connected to steam-chest or admission-pipe of cylinder by pipes (not shown) passing under cylinder-lagging. The ports T $T^2$ N $N^2$, Fig. 2, are connected in similar manner to exhaust-chest or exhaust-pipe of cylinder. In this way it will be noted that controlling-valve E is continually filled with live steam from steam chest or pipe passing through pipes above referred to, through ports U $U^2$, grooves P $P^2$, and into openings O $O^2$ of controlling-valve E.

Method of operation: In position shown in Fig. 2 the admission-valve of the engine connected to $C^2$—*i. e.*, the valve at the left end of cylinder—will be admitting steam into cylinder, while steam will be exhausting out of opposite end through exhaust-valve connected to rod D and piston of engine will be traveling toward the right. Controlling-valve E, which is connected to eccentric on main shaft, is also moving toward the right-hand side. When spiral groove $M^2$ uncovers port $H^2$, steam will pass through $M^2$ $H^2$, throwing the valve $A^2$ toward the left, closing the engine-port at that end. The steam which was on opposite end of controlling-piston $A^2$ will have passed out through ports $G^2$ $T^2$ through pipes before mentioned into exhaust-chest or exhaust-pipe of cylinder. The steam in cylinder of engine will expand. When groove S reaches port K, valve B will be moved toward the left and the exhaust-valve connected to D at right end of cylinder is closed, allowing compression to take place in right end of cylinder, the steam which was on opposite end of piston B having exhausted through port L, groove R, and port N. When opening $O^2$ reaches $L^2$, piston $B^2$ is moved toward the left, opening exhaust-valve connected to $D^2$, allowing release to take place in left end of cylinder, the steam which was on opposite end of valve B having passed out through ports $K^2$ $T^2$. Similarly, when annular part of opening S reaches port G piston A is moved toward the left, opening admission-valve connected to rod C or at the right end of cylinder, steam which was on opposite end of piston A having passed out through port H, grooves R, and port N. The controlling-valve E will now begin its return stroke, when the movement of the valve will be as before described. The rod F, which is rigidly connected to valve E, receives lineal motion from the eccentric fixed to main shaft and rotary from rocker-arm V, connected to governor, as before described. It will be observed that as end of rocker-arm V is raised, due to the increased speed of governor, rod F and valve E will be rotated in direction indicated by arrow on F, which will cause spiral grooves M M² to uncover ports H H² at an earlier point of movement of the controlling-valve E, thereby causing earlier cut-off in engine. Similarly, when controlling-valve E revolves in opposite direction from that indicated by the arrow spiral grooves M M² uncover H H² at a later point of movement of controlling-valve E, thereby producing a later point of cut-off in engine relative to the movement of the controlling-valve E. The lower or spiral part of grooves S S² will also uncover parts K K² closing the exhaust-valve at an earlier point of movement of the controlling-valve E as it is rotated in direction indicated by arrow, thereby producing greater compression, and when controlling-valve E is rotated in the opposite direction the compression is reduced, while O, O², and R remain in the same position, thereby allowing the points of admission and release to remain fixed.

The valves A, A², B, and B² are constructed with different piston areas for the purpose of cushioning said valves at the end of stroke, thereby preventing the knock, which would otherwise be produced. Valve A², for example, in moving toward the right will meet with no resistance until opening W² is passed, when valve A² is cushioned. Similarly, it is cushioned at opposite end by passing into recess X³.

Having thus described my invention, I claim as new and desire to secure by Letters Patent—

1. A steam-actuated valve-gear comprising a hollow cylindrical controlling-valve with spiral and annular openings, admission and exhaust valve and actuating-pistons, controlled by said hollow controlling-valve, substantially as shown and described.

2. A steam-actuated valve-gear comprising a hollow cylindrical controlling-valve with spiral and annular openings, admission and exhaust valve actuating-pistons controlled by said valve, valve having fixed valve-rod passing through rocker-arm and connected to shaft-eccentric by means of ball-joint, said rocker-arm being connected to and vibrated by governor, substantially as shown and described.

3. A steam-actuated valve-gear comprising a hollow cylindrical controlling-valve with spiral and annular openings, actuating-pistons connected to and operating engine admission and exhaust valves, a valve-stem fixed to controlling-valve passing through rocker-arm and connected to eccentric by means of ball-joint and interposed rod, substantially as shown and described.

4. A steam-actuated valve-gear comprising a hollow cylindrical controlling-valve with spiral and annular openings, said valve having fixed valve-rod, admission and exhaust valve actuating-pistons, said pistons having differential areas, a rocker-arm attached to and vibrated by governor, said rocker-arm having fixed key engaging prolonged keyway in valve-rod and an interposed rod with ball-joint connecting said valve-rod to eccentric having fixed throw, substantially as shown and described.

WILLIAM HENRY COLLIER.

Witnesses:
J. E. COBB,
J. K. DAVIS.